(12) United States Patent
Lee et al.

(10) Patent No.: US 10,112,608 B2
(45) Date of Patent: Oct. 30, 2018

(54) VEHICLE CONTROL DEVICE MOUNTED ON VEHICLE AND METHOD FOR CONTROLLING THE VEHICLE

(71) Applicant: LG Electronics Inc., Seoul (KR)

(72) Inventors: Jaeho Lee, Seoul (KR); Yonghwan Lee, Seoul (KR); Sunghwan Choi, Seoul (KR); Dukyung Jung, Seoul (KR); Ilwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/462,228

(22) Filed: Mar. 17, 2017

(65) Prior Publication Data

US 2018/0126985 A1    May 10, 2018

(30) Foreign Application Priority Data

Nov. 9, 2016    (KR) .................. 10-2016-0148961

(51) Int. Cl.
| | |
|---|---|
| *B60W 50/14* | (2012.01) |
| *B60W 40/02* | (2006.01) |
| *B60W 30/14* | (2006.01) |
| *B60W 30/09* | (2012.01) |
| *B60W 50/08* | (2012.01) |

(Continued)

(52) U.S. Cl.
CPC .......... *B60W 30/09* (2013.01); *B60W 50/082* (2013.01); *B60W 50/14* (2013.01); *G05D 1/0088* (2013.01); *G08G 1/165* (2013.01); *G08G 1/166* (2013.01); *B60R 21/36* (2013.01); *B60R 21/38* (2013.01); *B60W 2050/146* (2013.01); *B60W 2420/40* (2013.01); *B60W 2420/42* (2013.01); *B60W 2420/52* (2013.01); *B60W 2420/54* (2013.01); *B60W 2540/02* (2013.01); *B60W 2540/22* (2013.01); *B60W 2540/28* (2013.01); *B60W 2550/308* (2013.01); *B60W 2720/24* (2013.01)

(58) Field of Classification Search
CPC .... B60W 30/09; B60W 50/14; B60W 50/082; B60W 2550/308; B60W 2050/146; B60W 2420/42; B60W 2420/52; B60W 2720/24; G08G 1/166; G08G 1/165; G08G 1/161; G08G 1/163; G05D 1/0088
See application file for complete search history.

(56) References Cited

U.S. PATENT DOCUMENTS

| | | | |
|---|---|---|---|
| 6,559,761 B1* | 5/2003 | Miller | ............... B60R 1/00 340/435 |
| 8,229,663 B2* | 7/2012 | Zeng | ............... B60W 40/02 180/168 |

(Continued)

FOREIGN PATENT DOCUMENTS

| | | |
|---|---|---|
| EP | 2492165 A1 | 8/2012 |
| KR | 10-2010-0012578 A | 2/2010 |
| KR | 10-2014-0032658 A | 3/2014 |

*Primary Examiner* — Michael J Zanelli
(74) *Attorney, Agent, or Firm* — Birch, Stewart, Kolasch & Birch, LLP

(57) ABSTRACT

A vehicle control device provided in a vehicle includes a communication unit, a sensing unit, a display unit, and a processor configured to output driving-related information of an adjacent vehicle decided using at least one of the communication unit and the sensing unit on the display unit based on a satisfaction of a preset condition.

18 Claims, 18 Drawing Sheets

(51) Int. Cl.
    *G05D 1/00*     (2006.01)
    *G08G 1/16*     (2006.01)
    *B60R 21/36*     (2011.01)
    *B60R 21/38*     (2011.01)

(56) References Cited

U.S. PATENT DOCUMENTS

| | | |
|---|---|---|
| 2006/0224301 A1 | 10/2006 | Sakagami et al. |
| 2007/0010944 A1 | 1/2007 | Ferrebee, Jr. et al. |
| 2007/0016372 A1* | 1/2007 | Browne ............... G01C 21/005 701/469 |
| 2009/0309757 A1 | 12/2009 | Mudalige et al. |
| 2010/0020169 A1 | 1/2010 | Jang et al. |
| 2013/0090803 A1* | 4/2013 | Stahlin ................. G06K 9/6289 701/30.3 |
| 2014/0195072 A1* | 7/2014 | Graumann ............ G01S 5/0072 701/2 |
| 2016/0277513 A1* | 9/2016 | Kim ........................ H04L 67/18 |

* cited by examiner (a)

(b)

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2016-0148961, filed on Nov. 9, 2016, the contents of which are incorporated by reference herein in its entirety.

BACKGROUND OF THE INVENTION

1. Field of the Invention

This specification relates to a vehicle control device mounted on a vehicle and a method for controlling the vehicle.

2. Background of the Invention

A vehicle is an apparatus which can be driven by a user who gets therein in a desired direction, and a representative example may be a car.

For convenience of a user using a vehicle, various sensors and electronic devices are equipped in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, or turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

Meanwhile, as the development of the advanced deriving assist system (ADAS) is actively undergoing in recent time, development of a technology for optimizing user's convenience and safety while driving a vehicle is required.

As one effort, technologies for various user interfaces/user experiences (UI/UX), which can help a driver to drive a vehicle by recognizing (predicting) intents of surrounding vehicles (driving intention, expected driving path, expected driving speed, expected driving direction) while a vehicle disclosed herein is driving are needed to be developed.

SUMMARY OF THE INVENTION

Therefore, an aspect of the detailed description is to provide a vehicle control device capable of providing a driving intention of an adjacent vehicle in an optimized method, and a method for controlling the vehicle.

Another aspect of the detailed description is to provide a vehicle control device, capable of providing an optimized driving path of the vehicle by reflecting driving states of adjacent vehicles, and a method for controlling the vehicle.

Another aspect of the detailed description is to provide a vehicle control device, capable of more accurately determining a surrounding state of the vehicle or a driving intention of an adjacent vehicle, and a method for controlling the vehicle.

Problems to be solved in the present invention may not be limited to the aforementioned, and other unmentioned problems to be solved will be understood by those skilled in the art from the following description.

To achieve these and other advantages and in accordance with the purpose of this specification, as embodied and broadly described herein, there is provided a vehicle control device provided in a vehicle, the device including a communication unit, a sensing unit, a display unit, and a processor configured to output driving-related information of an adjacent vehicle decided using at least one of the communication unit and the sensing unit on the display unit based on a satisfaction of a preset condition.

In an embodiment disclosed herein, the driving-related information of the adjacent vehicle may include at least one of speed information related to the adjacent vehicle, acceleration/deceleration information related to the adjacent vehicle or expected moving direction information related to the adjacent vehicle.

In an embodiment disclosed herein, the processor may decide the driving-related information of the adjacent vehicle based on at least one of a state of the adjacent vehicle or a driving state of the adjacent vehicle, sensed through the sensing unit.

In an embodiment disclosed herein, the processor may receive the driving-related information of the adjacent vehicle from the adjacent vehicle through the communication unit.

In an embodiment disclosed herein, the processor may output first information, other than second information, on the display unit when the first information related to driving of the adjacent vehicle is received through the communication unit and the second information related to the driving of the adjacent vehicle is decided through the sensing unit.

In an embodiment disclosed herein, the processor may output first information and second information on the display unit in a visually distinguishing manner, when the first information related to driving of a first adjacent vehicle is decided through the communication unit and the second information related to driving of a second adjacent vehicle, different from the first adjacent vehicle, is decided through the sensing unit.

In an embodiment disclosed herein, the processor may output both of first information and second information on the display unit when the first information received through the communication unit and the second information sensed through the sensing unit are different from each other.

In an embodiment disclosed herein, the processor may request for information from at least one another adjacent vehicle when first information received through the communication unit and second information decided through the sensing unit are different from each other, and decide one of the first information and the second information based on the information received from the at least one another adjacent vehicle.

In an embodiment disclosed herein, the preset condition may include at least one of when a vehicle manipulation is executed to change a driving path of the vehicle, when the adjacent vehicle comes into a predetermined distance from the vehicle, when specific information is sensed from the adjacent vehicle, or when a user input is received.

In an embodiment disclosed herein, the driving-related information of the adjacent vehicle may be output on the display unit on the assumption that the preset condition is satisfied.

In an embodiment disclosed herein, the processor may output driving guide information related to the vehicle on the display unit, together with the driving-related information of the adjacent vehicle. Here, the driving guide information may have the driving-related information of the adjacent vehicle reflected thereto.

In an embodiment disclosed herein, the driving guide information related to the vehicle may be changed, in response to a change in the driving-related information of the adjacent vehicle.

In an embodiment disclosed herein, the vehicle may be capable of driving autonomously. The processor may change an output method of a content when the preset condition is satisfied in an output state of the content on the display unit during the autonomous driving of the vehicle and output both of the content with the changed output method and the driving-related information of the adjacent vehicle on the display unit.

In an embodiment disclosed herein, the vehicle may be capable of driving autonomously. When a driving state of the vehicle is changed during the autonomous driving of the vehicle, the processor may output information notifying a reason of the change in the driving state sensed through the sensing unit on the display unit.

In an embodiment disclosed herein, the processor may request the adjacent vehicle to transmit the driving-related information of the adjacent vehicle through the communication unit when the driving-related information of the adjacent vehicle cannot be decided by data sensed through the sensing unit.

In an embodiment disclosed herein, when a specific situation is sensed through at least one of the communication unit or the sensing unit, the processor may output on the display unit information notifying the specific situation and driving guide information related to the vehicle according to the specific situation.

A vehicle in accordance with one embodiment of the present invention may include a vehicle control device described in this specification.

A method for controlling a vehicle having a vehicle control device in accordance with one embodiment of the present invention may include deciding driving-related information of an adjacent vehicle using at least one of a communication unit and a sensing unit, and outputting the decided driving-related information of the adjacent vehicle on the display unit on the basis of a satisfaction of a preset condition.

In an embodiment disclosed herein, the driving-related information of the adjacent vehicle may include at least one of speed information related to the adjacent vehicle, acceleration/deceleration information related to the adjacent vehicle or expected moving direction information related to the adjacent vehicle.

In an embodiment disclosed herein, the preset condition may include at least one of when a vehicle manipulation is executed to change a driving path of the vehicle, when the adjacent vehicle comes into a predetermined distance from the vehicle, when specific information is sensed from the adjacent vehicle, or when a user input is received.

Details of other embodiments will be provided in the detailed description and the drawings.

According to the embodiments of the present invention, at least one of the following effects can be obtained.

First, the present invention can provide an optimized user interface, capable of notifying a driver of a more correct driving intention of an adjacent vehicle using a sensing unit and a communication unit.

Second, the present invention can provide a vehicle control device, capable of complementing the driving intention of the adjacent vehicle to be more correct, by using the communication unit, when the driving intention of the adjacent vehicle decided through the sensing unit is uncertain, and a method for controlling the vehicle.

The effects of the present invention may not be limited to the aforementioned effects, and other effects which have not been described will be clearly understood by those skilled in the art from the description of claims.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
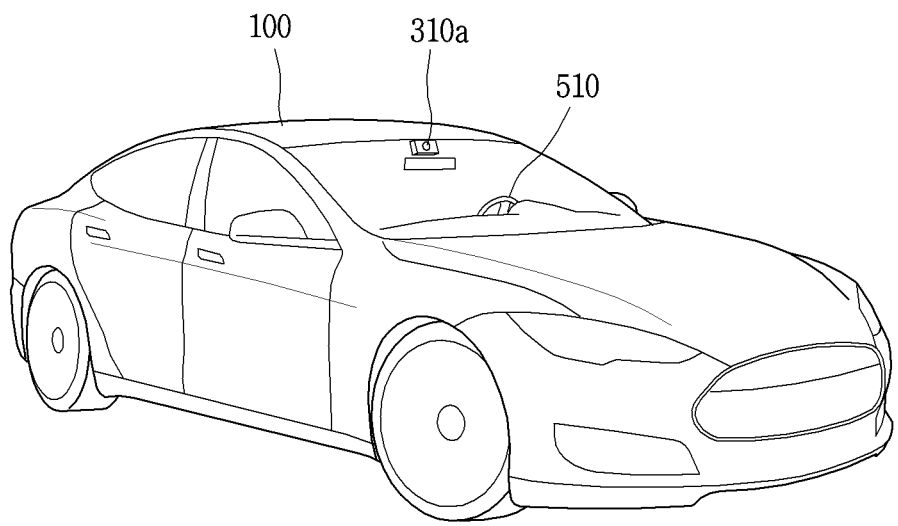
FIG. 1 is a view illustrating appearance of a vehicle in accordance with an embodiment of the present invention.
Figure 1:
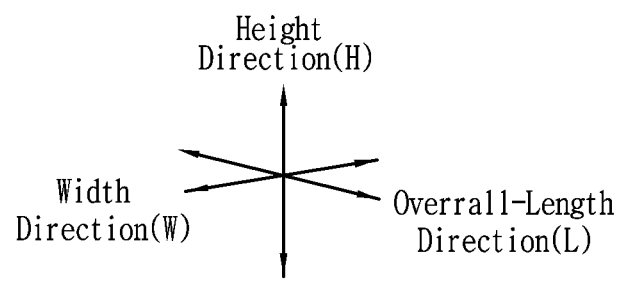

FIG. 1 is a view illustrating appearance of a vehicle in accordance with an embodiment of the present invention.

Figure 2:
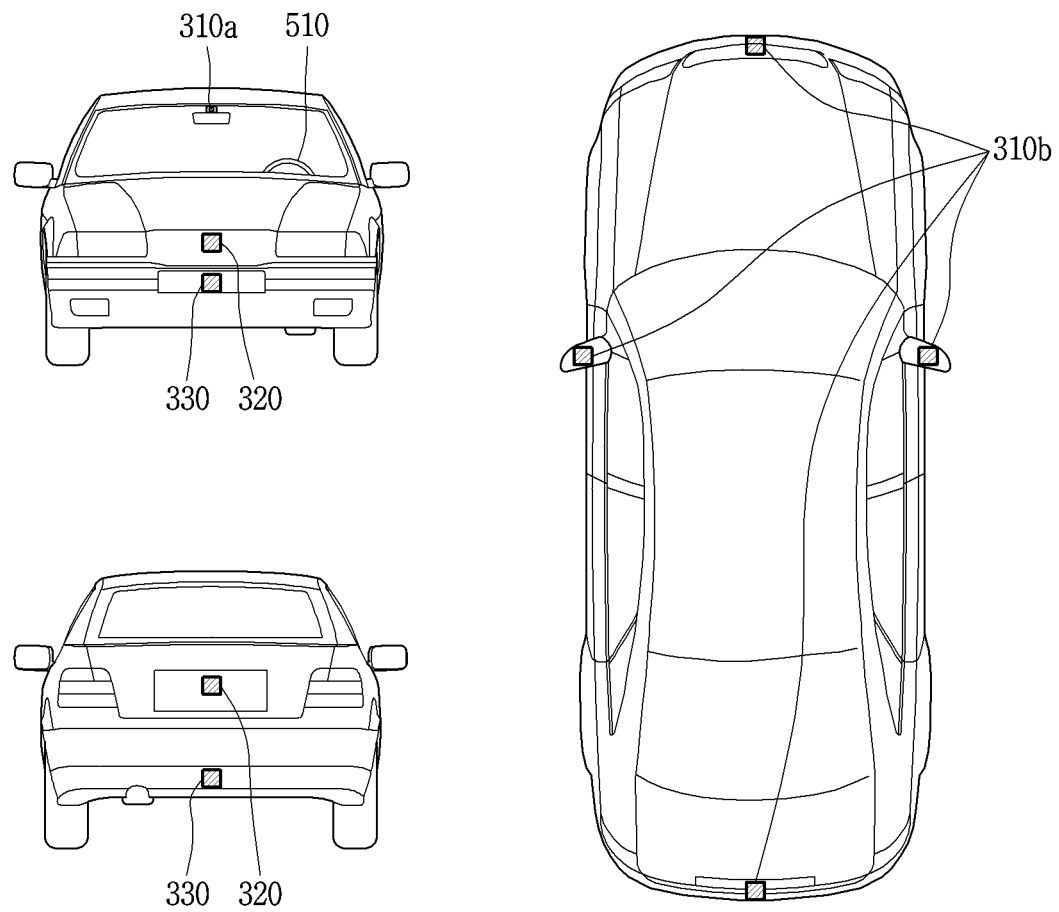
FIG. 2 is an outer view of the vehicle according to the embodiment of the present invention, viewed at various angels.

FIG. 2 is an outer view of the vehicle according to the embodiment of the present invention, viewed at various angels.

Figure 3:
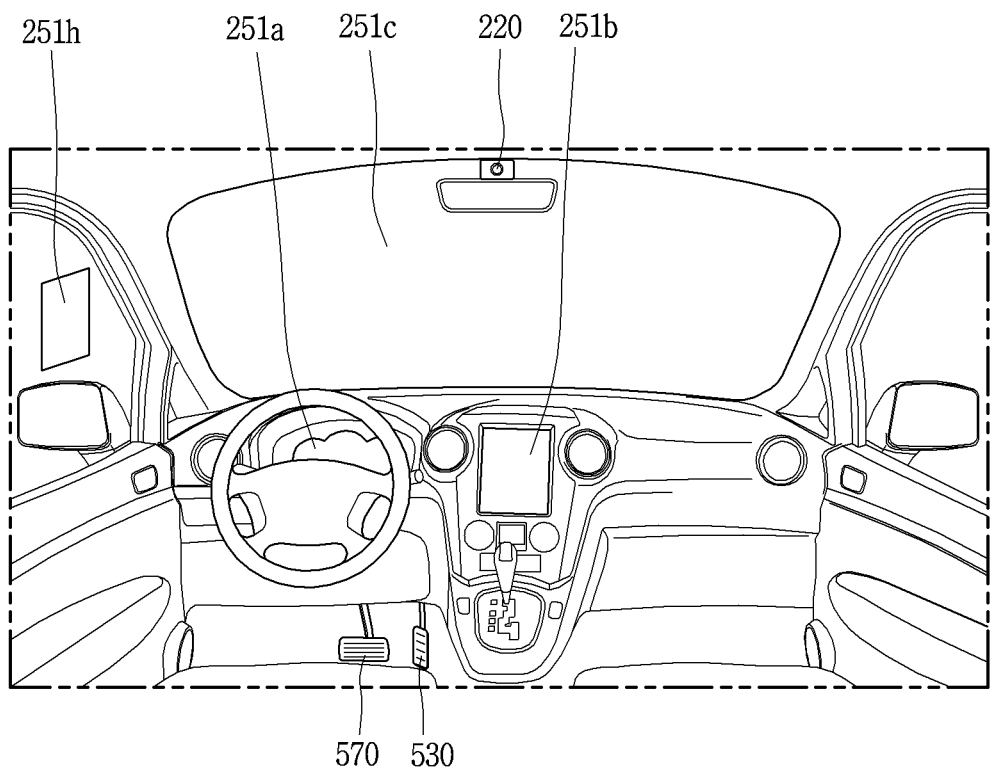
FIGS. 3 and 4 are views illustrating an inside of the vehicle in accordance with the embodiment of the present invention.
Figure 4:
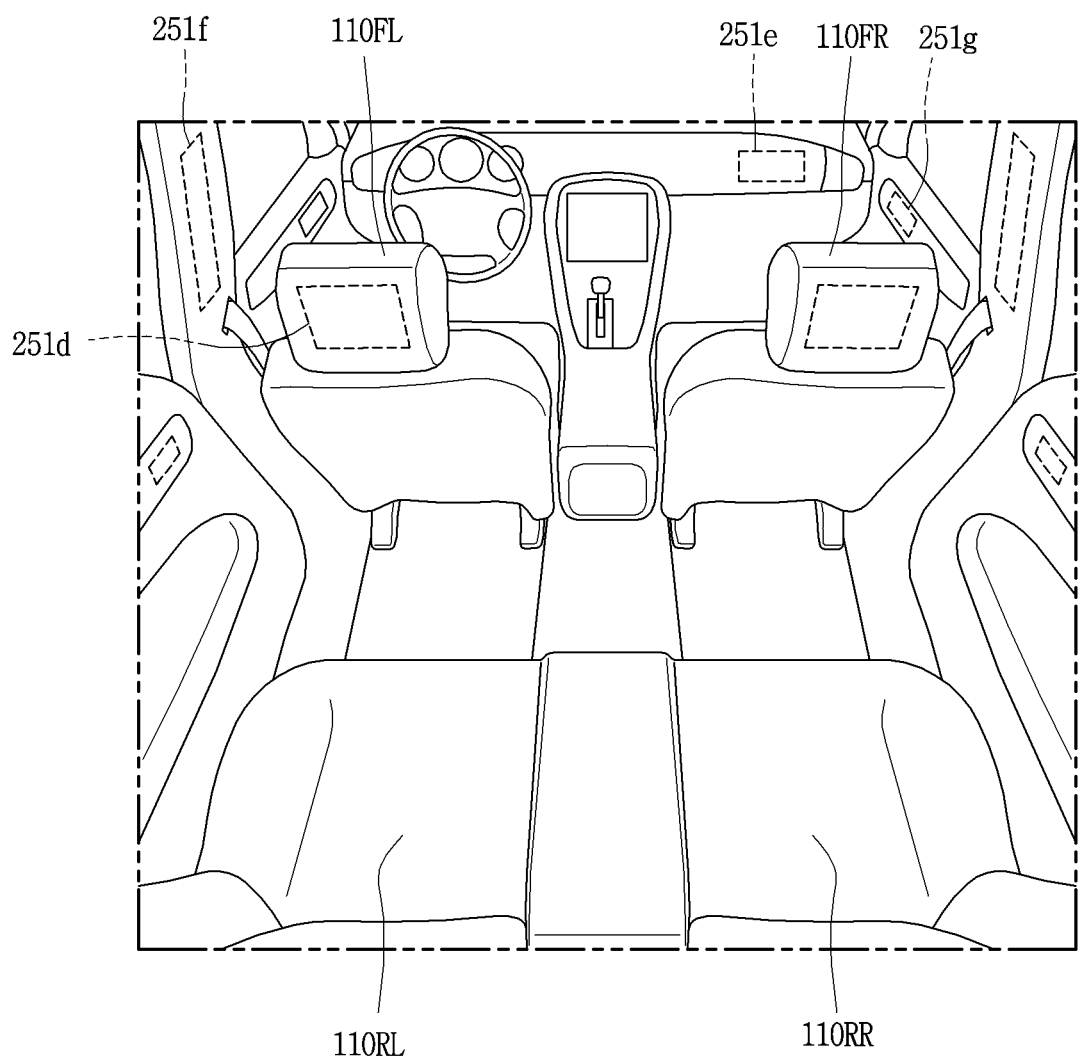

FIGS. 3 and 4 are views illustrating an inside of the vehicle in accordance with the embodiment of the present invention.

Figure 5:
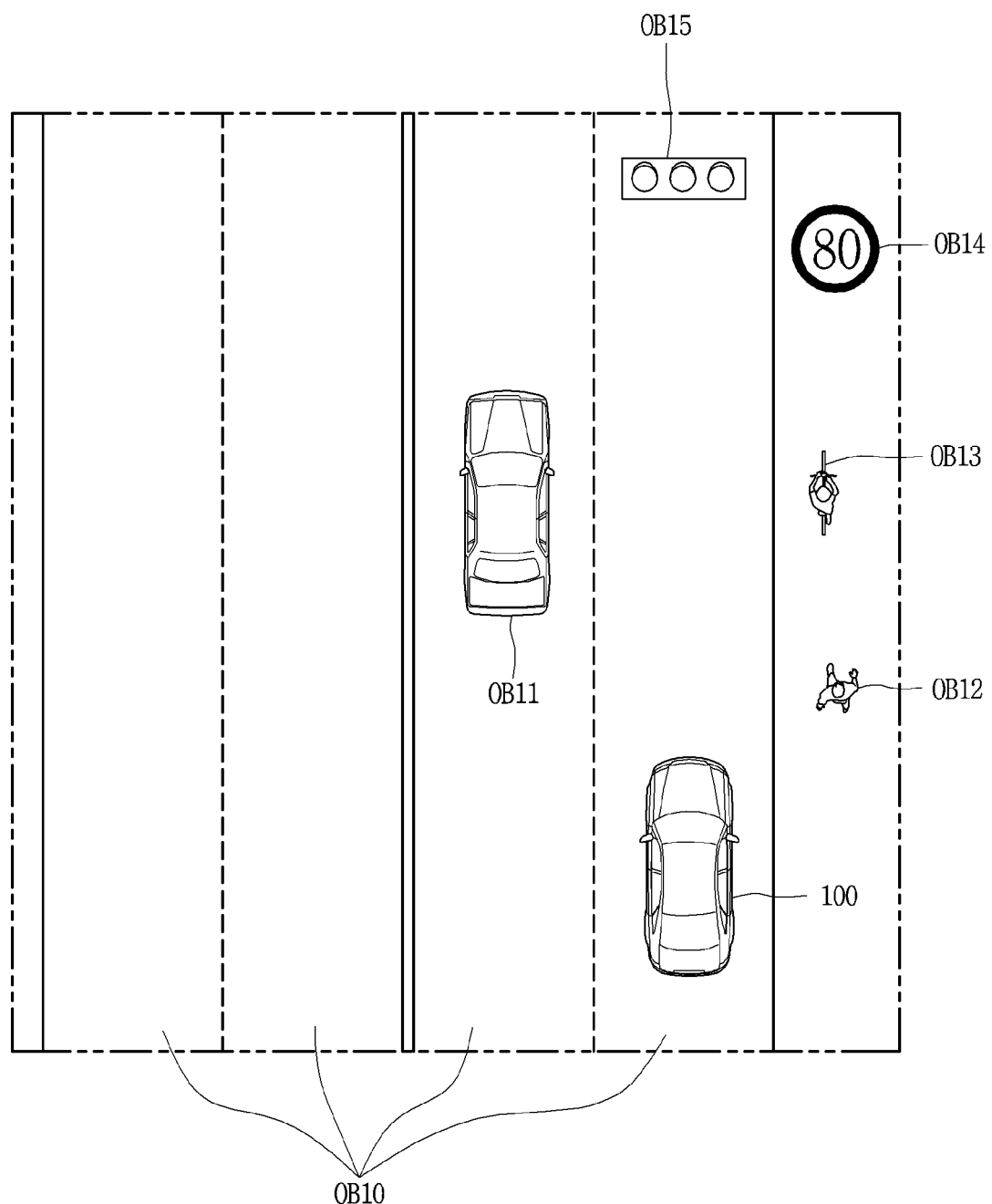
FIGS. 5 and 6 are reference views illustrating objects in accordance with an embodiment of the present invention.
Figure 6:
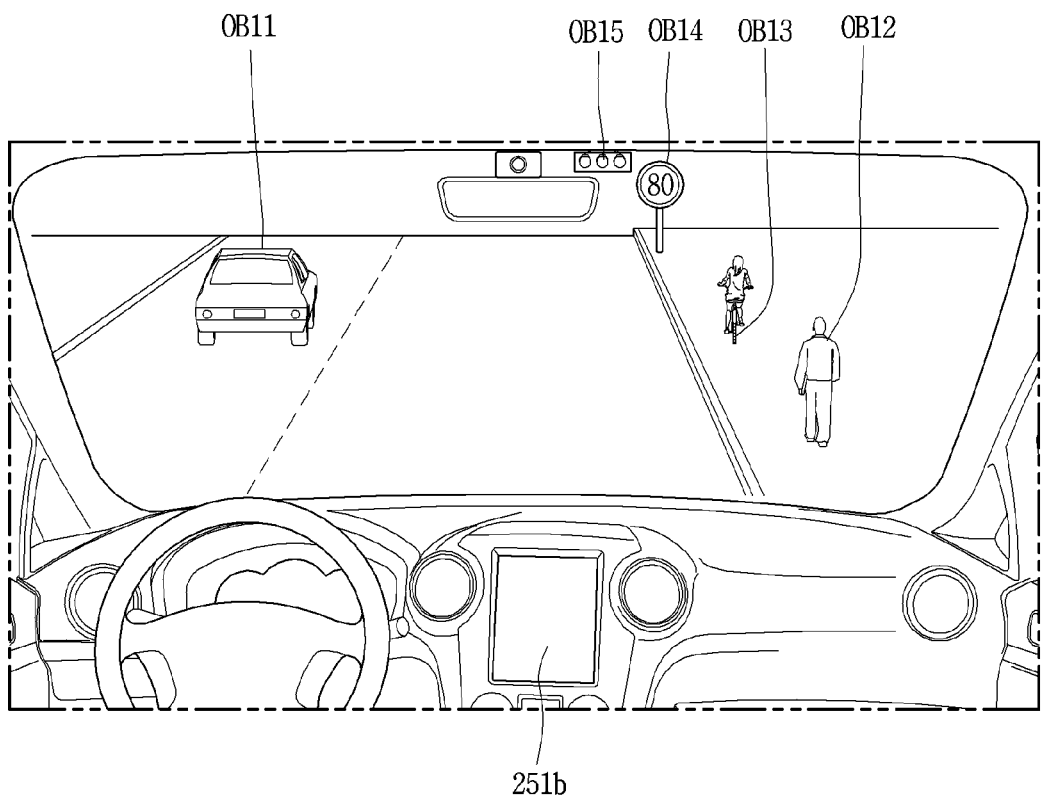

FIGS. 5 and 6 are reference views explaining objects in accordance with an embodiment of the present invention.

Figure 7:
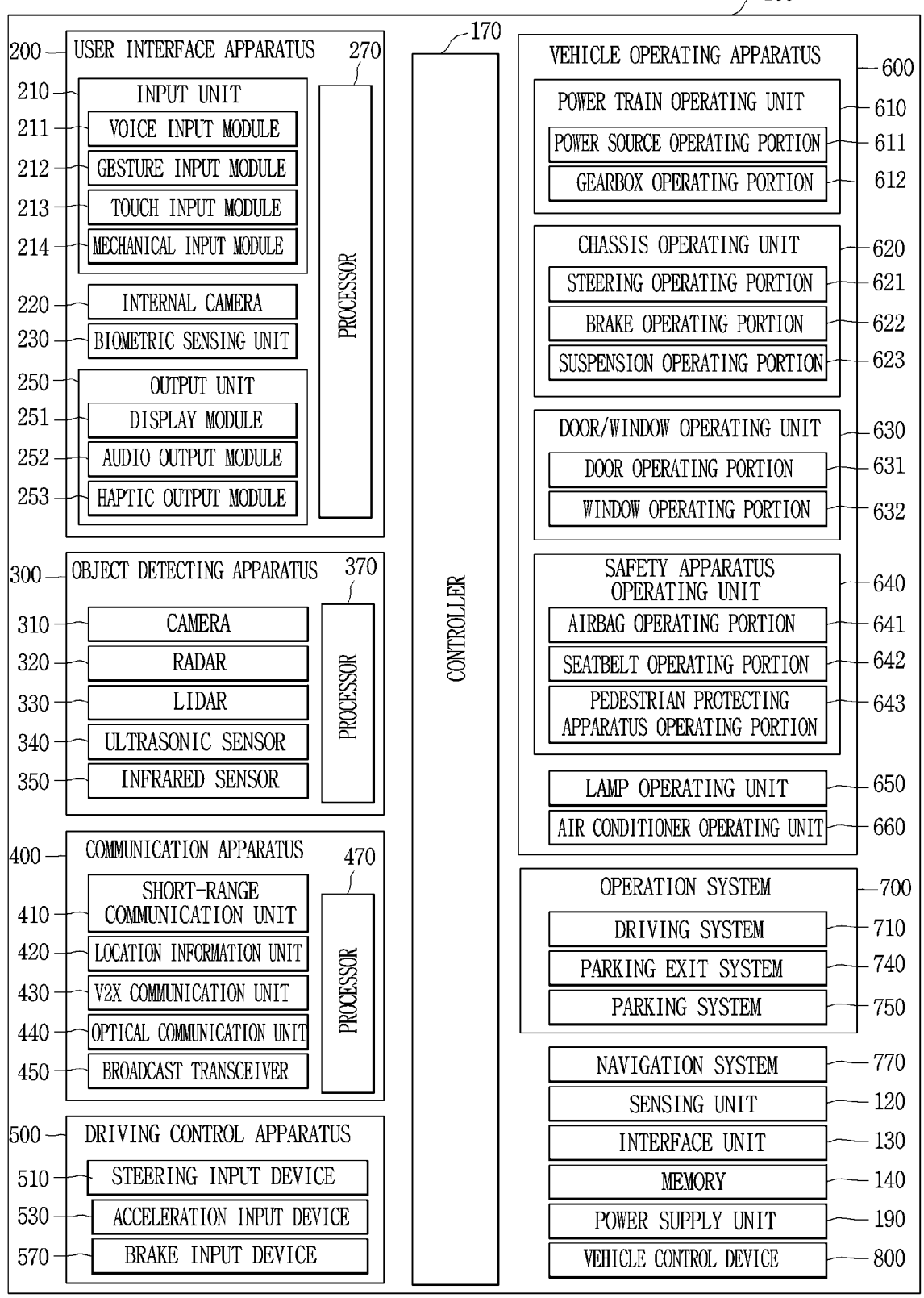
FIG. 7 is a block diagram illustrating a vehicle in accordance with an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB10 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOF manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present invention may include a vehicle control device 800.

The vehicle control device 800 may control at least one of the components illustrated in FIG. 7. From this perspective, the vehicle control device 800 may be the controller 170.

With no limit to this, the vehicle control device 800 may be a separate component, independent of the controller 170. When the vehicle control device 800 is implemented as a component independent of the controller 170, the vehicle control device 800 may be provided in a part of the vehicle 100.

Hereinafter, for the sake of explanation, the vehicle control device 800 will be described as a separate component, independent of the controller 170. In this specification, functions (operations) and control methods illustrated in relation to the vehicle control device 800 may be performed by the controller 170 of the vehicle. That is, every content illustrated in relation to the vehicle control device 800 (or the processor 870 included in the vehicle control device 170) may also be applied equally/similarly to the controller 170.

Hereinafter, the vehicle control device 800 disclosed in this specification may include some of the components illustrated in FIG. 7 and various components provided in the vehicle. In this specification, for the sake of explanation, separate names and reference numerals will be given to those components illustrated in FIG. 7 and the various components provided in the vehicle.

Hereinafter, components included in the vehicle control device 800 in accordance with one embodiment of the present invention will be described in more detail, with reference to the accompanying drawings.

Figure 8:
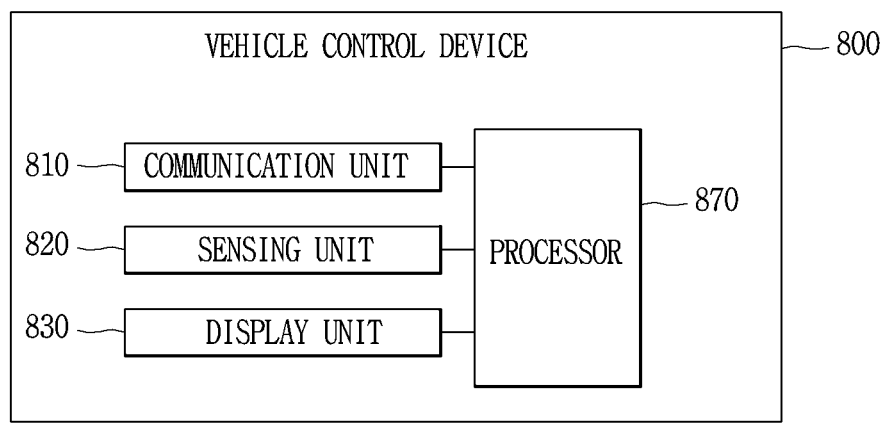
FIG. 8 is a conceptual view illustrating a vehicle control device in accordance with an embodiment of the present invention.

FIG. 8 is a conceptual view illustrating a vehicle control device in accordance with an embodiment of the present invention.

The vehicle control device 800 according to the present invention may include a communication unit 810, a sensing unit 820, a display unit 830, a processor 870 and the like.

The communication unit 810 may be the aforementioned communication apparatus 400. The communication unit 810 may perform communication with adjacent vehicles (or other vehicles). This may be referred to as vehicle to vehicle (V2V) communication. The V2V communication may generally be defined as a technology of exchanging information between vehicles, and also allow for sharing positions of adjacent vehicles, speed information and the like.

Also, the communication unit 810 may perform communication with every communication-allowable device (e.g., mobile terminal, server, etc.). This may be referred to as vehicle to everything (V2X) communication. The V2X communication may generally be defined as a technology of communicating with road infrastructures and other vehicles and exchanging or sharing information, such as traffic condition and the like, while the vehicle moves.

The V2V communication may be understood as one example of the V2X communication or understood as a concept included in the V2X communication.

The processor 870 may perform V2V communication or V2X communication with an adjacent vehicle (another vehicle) through the communication unit 810.

In detail, the processor 870 may request for driving-related information from an adjacent vehicle and receive the driving-related information from the adjacent vehicle, through the communication unit 810.

Here, the adjacent vehicle may refer to at least one a vehicle existing within a predetermined distance from the vehicle 100 disclosed herein or a vehicle coming into a predetermined distance from the vehicle 100.

With no limit to this, the adjacent vehicle may also include every vehicle capable of performing communication with the communication unit 810 of the vehicle 100. For the sake of explanation, this specification will describe an example in which the adjacent vehicle is a vehicle which exists within a predetermined distance from the vehicle 100 or comes into the predetermined distance from the vehicle 100.

The predetermined distance may be decided based on a communication-allowable distance through the communication unit 810, decided according to a specification of a product, or decided/varied based on a user setting.

The driving-related information may include every type of information related to driving of the adjacent vehicle.

For example, the information related to driving of the adjacent vehicle may include intention information, basic information, additional information or the like.

The intention information may include an expected path, an expected direction, an expected speed and the like, which are desired by the adjacent vehicle. Also, the intent information may further include path information set in the adjacent vehicle, destination information, lane change reason information, an image captured by a camera provided on the adjacent vehicle, and the like.

The basic information may refer to information related to the adjacent vehicle. For example, the basic information related to the adjacent vehicle may include a current speed, an acceleration, a deceleration, a steering wheel angle, ON or OFF of a blinker, ON or OFF of an emergency blinker and the like.

The additional information may refer to information related to various functions executable in the adjacent vehicle. For example, the additional information may include a favorite place where the adjacent vehicle visits, a destination, social network service (SNS) information, and the like.

The processor 870 of the vehicle 100 may receive the driving-related information from the adjacent vehicle through the V2X communication or V2V communication using the communication unit 810.

Here, the driving-related information may be information indicating a driving intention of the adjacent vehicle, or may be processed into information indicating the driving intention by a preset algorithm (or specific program, application) of the processor 870.

That is, the present invention can predict (expect) how the adjacent vehicle is to move (drive), on the basis of information received through the communication unit. The prediction (expectation) may refer to the driving intention of the adjacent vehicle.

In this specification, it will be understood that the driving-related information of the adjacent vehicle refers to prediction information related to the driving of the adjacent vehicle or the driving intention of the adjacent vehicle.

Also, the driving-related information of the adjacent vehicle may include at least one of a current driving path, an expected path to be driven, an expected speed to be driven, a current driving direction, or an expected direction to be driven. Those information may be understood as a driving prediction or a driving intention of the adjacent vehicle.

The sensing unit 820 included in the vehicle control device 800 according to the present invention may be the object detecting apparatus 300 illustrated in FIG. 7 or the sensing unit 120 included in the vehicle 100.

Also, the sensing unit 820 may be a separate sensing unit, independent of the object detecting apparatus 300 included in the vehicle or the sensing unit 120 included in the vehicle 100. Even though the sensing unit 820 is such independent sensing unit, the sensing unit 830 may include characteristics of the sensing unit 120 or the object detecting apparatus 300 illustrated in FIG. 7.

The sensing unit 820 may include the camera 310 illustrated in FIG. 7.

Also, the sensing unit 820 may be implemented by combining at least two of the camera 310, the radar 320, the LiDAR 330, the ultrasonic sensor 340 and the infrared sensor 350 included in the object detecting apparatus 300, and the sensing unit 120.

The sensing unit 820 may detect an object existing adjacent to the vehicle 100, and sense information related to the object.

For example, the object may include the aforementioned adjacent vehicle, an adjacent person, an adjacent thing, a surrounding landform and the like, which are adjacent to the vehicle 100.

The sensing unit 820 may sense information related to an adjacent vehicle of the vehicle 100, and driving-related information of the adjacent vehicle.

The information related to the adjacent vehicle and the driving-related information of the adjacent vehicle, as aforementioned, may refer to information indicating a driving expectation or driving intention of the adjacent vehicle.

For example, the processor 870 may capture a surrounding image of the vehicle 100 using the camera 310 included in the sensing unit 820, and decide driving-related information of an adjacent vehicle existing within a predetermined distance from the vehicle 100, based on the captured image.

As another example, the processor 870 may sense a type of an adjacent object (e.g., adjacent vehicle), a speed of the adjacent vehicle, a distance between the adjacent vehicle and the vehicle 100, a driving path of the adjacent vehicle and the like, using at least one of the radar 320, the LiDAR 330, an ultrasonic sensor 340 or the infrared sensor 350 included in the sensing unit 820.

The processor 870 may decide driving-related information of the adjacent vehicle using the sensed data.

The driving-related information of the adjacent vehicle received through the communication unit 810 may have higher reliability and certainty than driving-related information of the adjacent vehicle decided based on data received through the sensing unit. This results from that the adjacent vehicle directly transmits its own driving-related information (i.e., driving intention).

On the other hand, the driving-related information of the adjacent vehicle decided through the sensing unit 820 may include a concrete intention and a speculative intention.

For example, when the adjacent vehicle moves into a currently-driving lane of the vehicle 100 with turning on a blinker, a driving intention of the adjacent vehicle can be understood as cutting-in. This case may be classified into the concrete intention.

As another example, when the adjacent vehicle decelerates (reduces speed) with turning on emergency blinkers, the vehicle 100 can recognize an intention that the adjacent vehicle is decelerating, but cannot recognize an intention why the adjacent vehicle decelerates. This case may be classified into the speculative intention.

As such, the driving-related information of the adjacent vehicle decided (guessed, predicted, expected) through the sensing unit 820 may be classified into the concrete intention and the speculative intention in various manners according to a preset algorithm. Also, a criterion (or algorithm) for classifying the concrete intention and the speculative intention may be preset when producing a product or decided or changed by a user setting.

Also, the sensing unit 820 may sense information related to the vehicle 100.

The vehicle-related information may be at least one of vehicle information (or a driving state of the vehicle) and surrounding information regarding the vehicle.

For example, the vehicle information may include a driving speed of the vehicle, a weight of the vehicle, the number of persons within the vehicle, a braking force of the vehicle, a maximum braking force of the vehicle, a driving mode (autonomous driving mode or manual driving mode) of the vehicle, a parking mode (autonomous parking mode, automatic parking mode, manual parking mode) of the vehicle, whether or not a user has got in the vehicle, information related to the user (e.g., whether or not the user is an authenticated user), and the like.

The surrounding information regarding the vehicle may include a state (frictional force) of a road surface on which the vehicle is currently driving, the weather, a distance from a front (or rear) vehicle, a relative speed of the front (or rear) vehicle, curvature of a curve when a currently-driving lane is a curve, ambient brightness of the vehicle, information related to an object existing within a reference area (predetermined area) based on the vehicle, an entrance/exit of the object into/from the predetermined area, a presence or absence of a user near the vehicle, information related to the user (e.g., whether or not the user is an authenticated user) and the like.

Also, the surrounding information regarding the vehicle (or surrounding environment information) may include external information regarding the vehicle (e.g., ambient brightness, temperature, solar position, adjacent object (person, another vehicle, road sign, etc.) to be captured, a type of a currently-driving road surface, a landmark, line information, lane information, and information required for autonomous driving/autonomous parking/automatic parking/manual parking modes.

Also, the surrounding information regarding the vehicle may further include a distance from an object existing adjacent to the vehicle up to the vehicle 100, a type of the object, a parking-available space for the vehicle, an object (e.g., a parking line, a string, other vehicle, a wall, etc.) for identifying a parking space, and the like.

In addition, the sensing unit 820 (or the processor 870) may sense (decide) driving-related information of the vehicle 100. For example, the processor 870 may decide a presence of an intent of a right turn, a left turn or cutting-in or the like when a steering wheel is turned in a specific direction with turning on a blinker in response to a driver's manipulation.

The driving-related information of the vehicle 100 may have the same/like characteristics as the driving-related information of the adjacent vehicle.

For example, the driving-related information of the vehicle 100 may include at least one of a currently-driving path, an expected path to be driven, a currently-driving speed, an expected speed to be driven, a currently-driving direction or an expected direction to be driven, and those information may be understood as a driving expectation or driving intention of the vehicle 100.

Hereinafter, for the sake of explanation, description will be given of an example in which the sensing unit 820 is provided separately in the vehicle control device 800. That the processor 870 acquires certain information through the sensing unit 820 may be understood as the processor 870 acquires the certain information using at least one of the object detecting apparatus 300 and the sensing unit 120 provided in the vehicle 100.

The vehicle control device 800 according to the present invention may include the display unit 830.

The display unit 830 may be the output unit 250 or the display module 251 illustrated in FIG. 7. Also, the display unit 830 may include an output unit (e.g., touch screen) of a mobile terminal that can perform communication with the communication unit 810.

As aforementioned, the display unit 830 may be implemented as a head up display (HUD).

Also, the display module 251 may include a transparent display. The transparent display may be attached on a windshield or a window.

The display module 251 may be disposed on one area of a steering wheel, one area 251*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The vehicle control device 800 according to the present invention may include a processor 870 that can control the communication unit 810, the interface unit 820, the sensing unit 830 and the like.

The processor 870 may be the controller 170 illustrated in FIG. 7.

The processor 870 may control those components illustrated in FIG. 7 and the components illustrated in FIG. 8.

The processor 870 included in the vehicle control device 800 according to the present invention may output the driving-related information of the adjacent vehicle, which is decided using at least one of the communication unit 810 or the sensing unit 820, on the display unit 830 based on a satisfaction of a preset condition.

Here, the driving-related information of the adjacent vehicle may include information in which the driving intention (expected driving path, expected driving speed, expected driving direction) of the adjacent vehicle is represented (processed, generated) using a graphic object.

The driving-related information of the adjacent vehicle may include at least one of speed information, acceleration information/deceleration information (i.e., acceleration/deceleration information) or information related to an expected moving direction.

Hereinafter, description will be given of various embodiments in which a vehicle control device provides a driving intention of an adjacent vehicle, with reference to the accompanying drawings.

Figure 9:
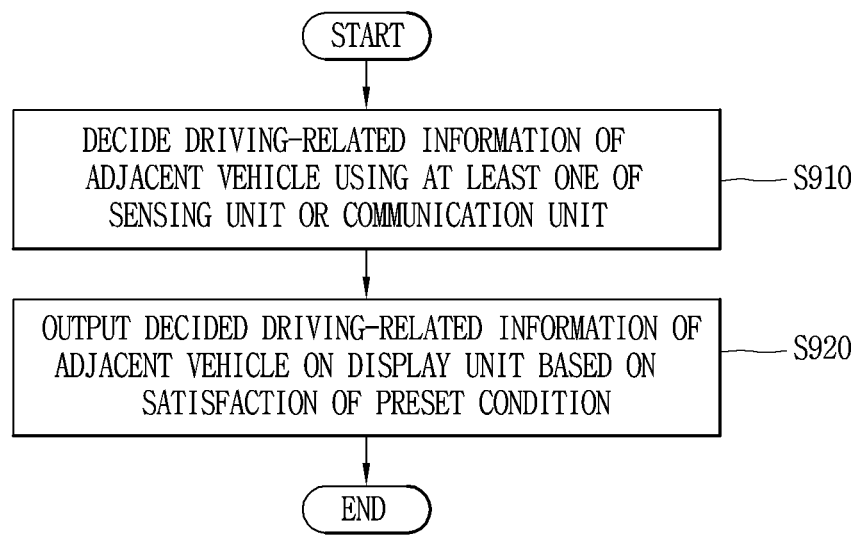
FIG. 9 is a flowchart illustrating a representative control method in accordance with the present invention.

FIG. 9 is a flowchart illustrating a representative control method in accordance with the present invention, and FIGS. 10, 11A, 11B, 11C, 11D, 11E, 12, 13A, 13B, 14, 15 and 16 are conceptual views illustrating the control method illustrated in FIG. 9 and various embodiments of the present invention.

As illustrated in FIG. 9, driving-related information of an adjacent vehicle is decided using at least one of the sensing unit 820 or the communication unit 810 (S910).

First, the processor 870 according to the present invention may decide the driving-related information of the adjacent vehicle on the basis of at least one of a state of the adjacent vehicle or a driving state of the adjacent vehicle, sensed through the sensing unit 820.

Here, the state of the adjacent vehicle may include whether or not the sensed adjacent vehicle turns on a blinker, whether or not the adjacent vehicle turns on emergency blinkers, whether or not the adjacent vehicle transmits a hand signal, whether or not brake lamps of the adjacent vehicle are turned on, whether or not wheels of the adjacent vehicle get twisted, and the like.

Also, the driving state of the adjacent vehicle may include a sensed current speed of the adjacent vehicle, an acceleration or deceleration of the adjacent vehicle, whether the adjacent vehicle accelerates, decelerates or drives at constant speed, a driving path of the adjacent vehicle, a position of the adjacent vehicle or the like.

As one example, the processor 870 may sense at least one of the state of the adjacent vehicle or the driving state of the adjacent vehicle when the adjacent vehicle is sensed within a predetermined distance (or predetermined area) from the vehicle 100. For example, the processor 870 may sense the state of the adjacent vehicle or the driving state of the adjacent vehicle using the camera of the sensing unit 820 or the LiDAR. The state or the driving state may be provided in a form of data or in a form of information processed at least one time.

The processor 870 may decide the driving-related information of the adjacent vehicle (the driving intention of the adjacent vehicle), using sensed information (or data). For example, the processor 870 may decide the driving-related information of the adjacent vehicle (the driving intention of the adjacent vehicle) by applying data acquired (received, sensed) through the sensing unit 820 to a preset algorithm.

Figure 11A:
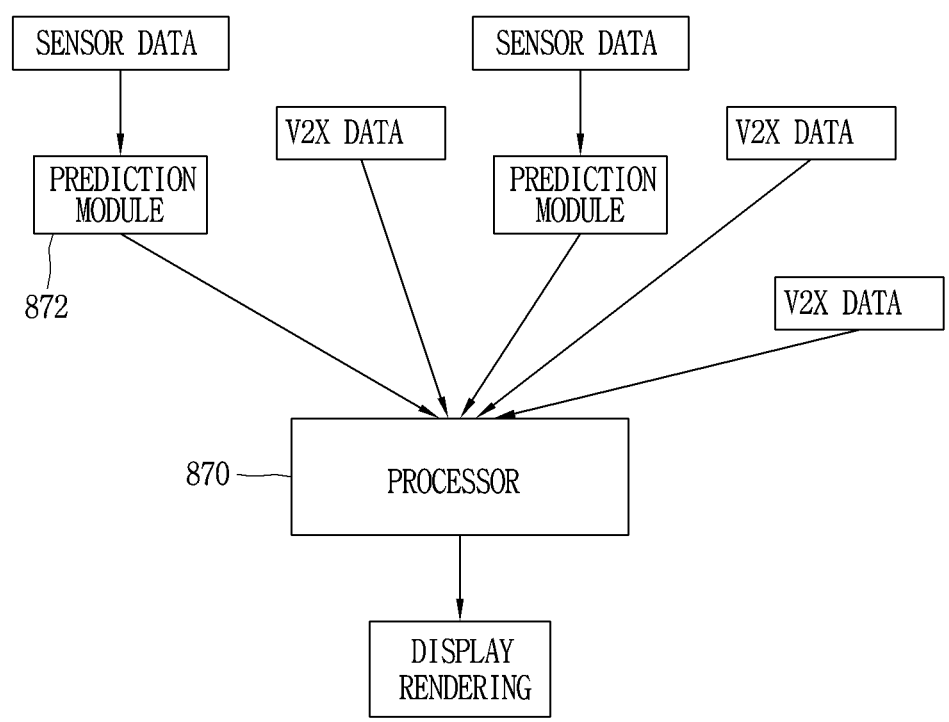

Referring to FIG. 11A, the present invention may further include a prediction module 872 for deciding the driving-related information of the adjacent vehicle. The preset algorithm for deciding the driving-related information of the adjacent vehicle (the driving intention of the adjacent vehicle) may be stored in the prediction module 872 (or memory) or be used in the prediction module 872.

The prediction module 872 may be a separate hardware module provided in the vehicle 100 (or vehicle control device 800), or may be software (e.g., program or application) installed in the processor 870.

Hereinafter, every characteristic/operation/function executable by the prediction module 872 may be executed even by the processor 870.

Figure 11B:
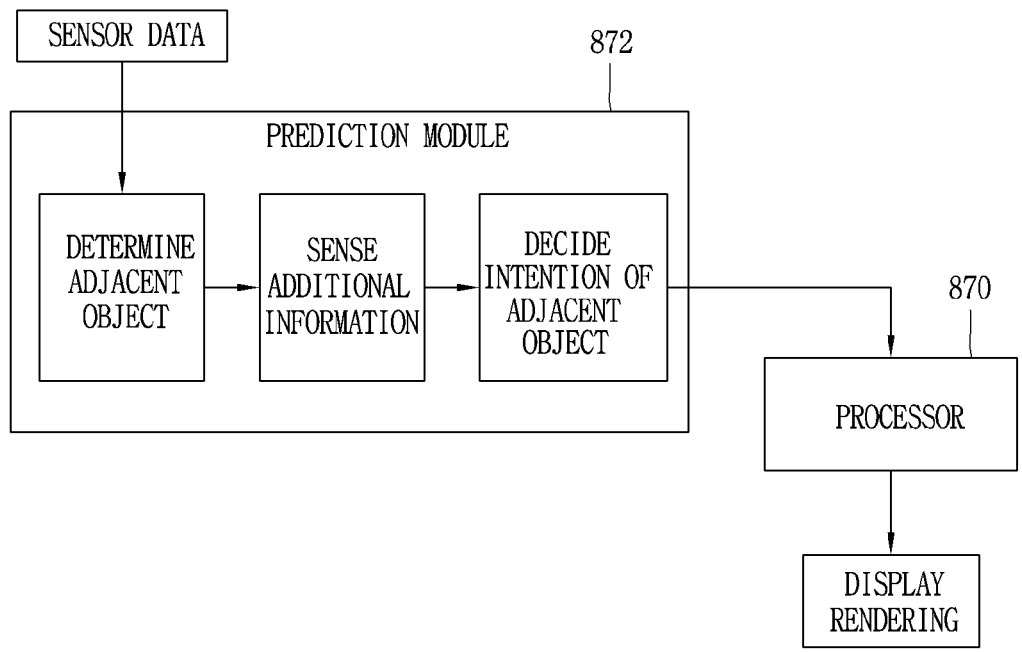
Figure 11C:
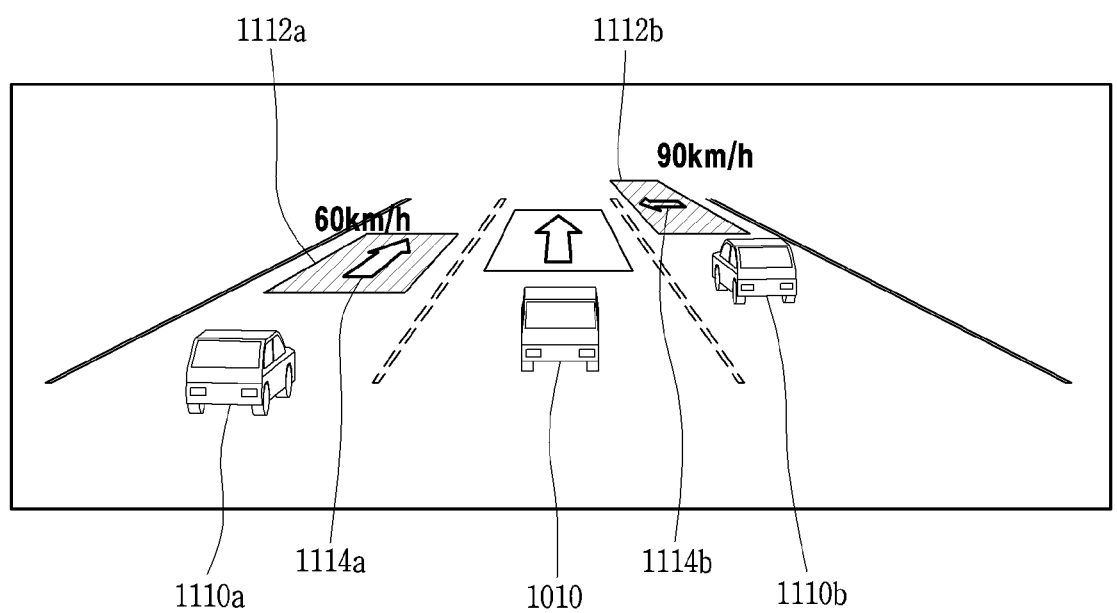

Referring to FIG. 11B, the prediction module 872 (or processor 870) may decide information related to an object (surrounding object), which exists adjacent to (exists within a predetermined distance from) the vehicle 100, using data sensed through the sensing unit 820.

Here, the object may be the adjacent vehicle, and the information related to the object may include a state of the adjacent vehicle (e.g., type, shape, size, etc. of the adjacent vehicle) or a driving state of the adjacent vehicle (driving pattern, speed, acceleration, deceleration, driving direction, etc.).

Also, the prediction module 872 (or processor 870) may sense additional information related to the object (adjacent vehicle) using the sensing unit 820 when the object (adjacent vehicle) is sensed.

For example, the prediction module 872 (or processor 870) may further sense, based on data sensed through the sensing unit 820, whether the sensed object (adjacent vehicle) turns on or off a turn blinker, emergency blinkers, brake lamps, a high beam or the like, whether or not a hand signal is sensed, whether or not a driving path is changed, whether or not a driving lane is changed, whether the sensed object accelerates or decelerates, or the like.

The prediction module 872 (or processor 870) may decide an intention of the object (adjacent vehicle) based on at least one of the sensed object-related information or the additional information. In this instance, the intention of the object (adjacent vehicle) refers to a driving intention, and may be decided based on a preset algorithm.

The preset algorithm may refer to an algorithm which is designed to generate (decide, predict, confirm) the driving-related information of the adjacent vehicle using data sensed through the sensing unit 820.

For example, the preset algorithm may decide the driving-related information (driving intention) of the adjacent vehicle that the adjacent vehicle is to change a lane to a position where a blinker is turned on, when a turn-on of the blinker of the adjacent vehicle is sensed in an image sensed through the sensing unit.

When the sensing unit 820 senses that the emergency blinkers of the adjacent vehicle are turned on, the processor 870 may apply the data sensed through the sensing unit 820 to the preset algorithm, so as to decide the driving intention of the adjacent vehicle (the driving-related information of the adjacent vehicle), such as whether or not the adjacent vehicle drives on the wrong side of a barrier, whether or not the adjacent vehicle suddenly cuts in other vehicles, whether or not the adjacent vehicle is under an emergency situation, whether or not the emergency blinkers mean an apology, whether or not the adjacent vehicle tries to overtake other vehicles, and the like.

Also, when the sensing unit 820 senses that a brake lamp of the adjacent vehicle is turned on, the processor 870 may apply the data sensed through the sensing unit 820 to the preset algorithm, so as to decide the driving intention of the adjacent vehicle (the driving-related information of the adjacent vehicle), such as whether or not the adjacent vehicle is braked, whether or not a driver of the adjacent vehicle drives with two feet or the like.

Also, when the sensing unit 820 senses high beam from an oncoming vehicle or a rear vehicle at the time of changing a lane, the processor 870 may apply the data sensed through the sensing unit 820 to the preset algorithm, so as to decide that the high beams make a warning or notify a breakdown of a specific component (e.g., headlamp, brake lamp, etc.) of the vehicle 100.

When a klaxon sound is sensed from the adjacent vehicle through the sensing unit 820, the processor 870 may apply the data sensed through the sensing unit 820 to the preset algorithm, so as to decide the driving intention of the adjacent vehicle (the driving-related information of the adjacent vehicle), such as whether or not the sound is a simple warning made by the adjacent vehicle or whether or not the sound results from aggressive driving/retaliatory driving.

The processor 870 may decide whether or not the adjacent vehicle allows the vehicle 100 to cut in front of it, on the basis of a sensed acceleration or deceleration of the adjacent vehicle while the vehicle 100 changes a lane.

Besides these described above, the preset algorithm for deciding the driving-related information of the adjacent vehicle through the sensing unit 820 may be designed/changed in various manners.

The driving-related information of the adjacent vehicle decided through the sensing unit 820 may be classified into a speculative intention and a concrete intention. For example, a turn blinker, an emergency blinker and the like may be classified into the concrete intention, and the other examples may be classified into the speculative intention.

The processor 870 may output information indicating the speculative intention and the concrete intention, included in the driving-related information of the adjacent vehicle decided through the sensing unit 820, on the display unit 830 in different manners.

For example, the processor 870 may output the information corresponding to the speculative intention in a first manner, and the information corresponding to the concrete intention in a second manner different from the first manner.

Here, the first and second manners may be different from each other in a display form of a graphic object, such as a color, a shape, transparency, a type of line and the like, and even different from each other in a type of output information.

Figure 11D:
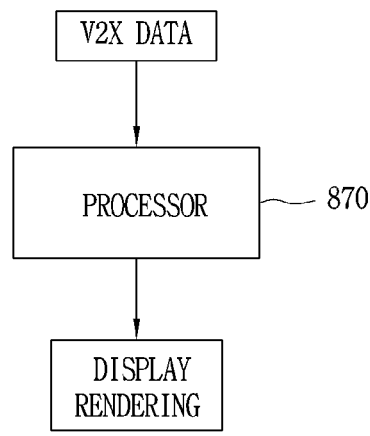

Meanwhile, referring to FIG. 11D, the processor 870 may receive the driving-related information of the adjacent vehicle from the adjacent vehicle through at least one of V2X communication or V2V communication using the communication unit 810.

The processor 870 may decide the driving intention of the driving vehicle on the basis of the received driving-related information of the adjacent vehicle.

The driving-related information of the adjacent vehicle received through the communication unit 810 may immediately be used without an operation of the separate prediction module 872. However, the present invention may not be limited to this. The driving-related information of the adjacent vehicle may alternatively be processed at least one time or reinterpreted (or regenerated) by the processor 870 even though being received from the adjacent vehicle through the communication unit 810.

Referring back to FIG. 9, afterwards, the decided driving-related information of the adjacent vehicle is output on the display unit based on a satisfaction of a preset condition (S920).

The processor 870 may generate the driving-related information of the object (adjacent vehicle) based on the decided intention of the object, and output the driving-related information of the adjacent vehicle on the display unit 830 based on the satisfaction of the preset condition.

The preset condition may refer to a condition for performing a function outputting the driving-related information of the adjacent vehicle.

The preset condition, for example, may include at least one of when a vehicle manipulation is executed to change the driving path of the vehicle, when the adjacent vehicle moves close to the vehicle within a predetermined distance, when specific information is sensed from the adjacent vehicle, or when a user input is received.

The vehicle manipulation of changing the driving path of the vehicle 100 may be executed by a driver in the manual driving mode, and also executed under the control of the controller 170 of the vehicle or the processor 870 of the vehicle control device 800 in the autonomous driving mode.

With this configuration, the present invention can output the driving intention of the adjacent vehicle and related information when driving of the vehicle according to the present invention changes or when the adjacent vehicle affecting the driving of the vehicle according to the present invention exists. Also, the present invention may not output the driving intention of the adjacent vehicle when the driving of the vehicle according to the present invention does not change or when the adjacent vehicle does not affect the driving of the vehicle according to the present invention.

Figure 10:
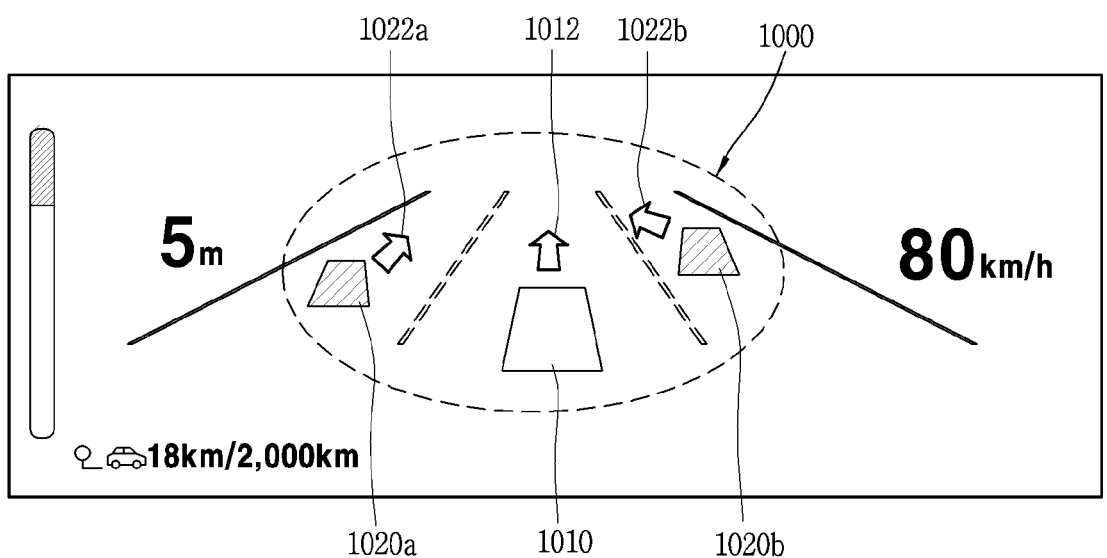
FIGS. 10, 11A, 11B, 11C, 11D, 11E, 12, 13A, 13B, 14, 15 and 16 are conceptual views illustrating the control method illustrated in FIG. 9 and various embodiments of the present invention.

Referring to FIG. 10, the processor 870 may decide the driving-related information of the adjacent vehicle using at least one of the communication unit or the sensing unit, and output the decided driving-related information of the adjacent vehicle on the display unit 830 on the basis of the satisfaction of the preset condition.

The display unit 830, as illustrated in FIG. 10, may output thereon the driving-related information 1000 of the adjacent vehicle.

For example, the processor 870 may output on the display unit 830 a graphic object 1010 corresponding to the vehicle 100, a graphic object 1012 indicating driving-related information of the vehicle 100, graphic objects 1020a and 1020b corresponding to adjacent vehicles, and graphic objects 1022a and 1022b indicating driving-related information (e.g., driving directions) of the adjacent vehicles.

Here, still referring to in FIG. 10, in the present invention, the driving-related information of the adjacent vehicle including the graphic objects 1010 and 1012 associated with the vehicle 100 according to the present invention and the graphic objects 1020a, 1020b, 1022a and 1022b associated with the adjacent vehicles may be output on the display unit 830 using the predetermined graphic interface 1000.

The graphic interface 1000, for example, may be referred to as 'driving intention interface,' 'driving intention graphic interface' and the like.

The driving-related information of the adjacent vehicle may include at least one of speed information, acceleration/deceleration information or expected moving direction information (or expected path information). With no limit to this, it should be noticed that the driving-related information of the adjacent vehicle can be understood as a concept including the driving-related information 1010 and 1012 of the vehicle 100.

Referring to FIG. 10, the expected moving direction information of the adjacent vehicle may be provided with the reference numerals 1022a and 1022b. A driver of the vehicle 100 according to the present invention may be provided with the driving-related information of the adjacent vehicle and accordingly intuitively recognize the driving intention of the adjacent vehicle, thereby more safely driving the vehicle.

Meanwhile, the processor 870 according to the present invention may output the driving-related information (driving intention) of the adjacent vehicle decided through the sensing unit and the driving-related information (driving intention) of the adjacent vehicle decided (received) through the communication unit in different manners.

The processor 870 may decide the driving-related information (driving intention) of the adjacent vehicle on the basis of at least one of the state of the adjacent vehicle or the driving state of the adjacent vehicle sensed through the sensing unit 820.

In this instance, the driving-related information of the adjacent vehicle may be output on the display unit 830 based on the satisfaction of the preset condition. As one example, referring to FIG. 11C, the display unit 830 may output thereon the driving-related information of the adjacent vehicle (e.g., graphic objects 1110a and 1110b corresponding to the adjacent vehicles, graphic objects 1112a and 1112b indicating expected driving paths of the adjacent vehicles, and graphic objects 1114a and 1114b indicating speeds or expected driving direction information of the adjacent vehicles), a graphic object 1010 corresponding to the vehicle 100 of the present invention, or the driving-related information of the vehicle 100 of the present invention).

Also, when the driving-related information of the adjacent vehicle is received from the adjacent vehicle through the communication unit 810, the processor 870 may output the received information on the display unit 830 based on the satisfaction of the preset condition.

In this instance, the processor 870 may request for the driving-related information of the adjacent vehicle from the adjacent vehicle and receive the requested driving-related information of the adjacent vehicle, when the adjacent vehicle comes into a predetermined distance from the vehicle 100 of the present invention, when the adjacent vehicle is sensed as a communication-allowed vehicle, or when the driving-related information of the adjacent vehicle decided through the sensing unit corresponds to preset information (e.g., speculative intention).

In this instance, the driving-related information of the adjacent vehicle may be transmitted from the adjacent vehicle to the vehicle 100 of the present invention when a driver of the adjacent vehicle agrees with the transmission, or when the transmission is preset.

Of course, from the perspective of the vehicle of the present invention, when the vehicle 100 of the present invention comes into the predetermined distance based on the adjacent vehicle or when the adjacent vehicle requests for driving-related information, the vehicle 100 of the present invention may transmit the driving-related information of the vehicle 100 of the present invention to the adjacent vehicle through the communication unit 810.

The driving-related information of the adjacent vehicle received through the communication unit may include more information than the driving-related information of the adjacent vehicle decided through the sensing unit.

Figure 11E:
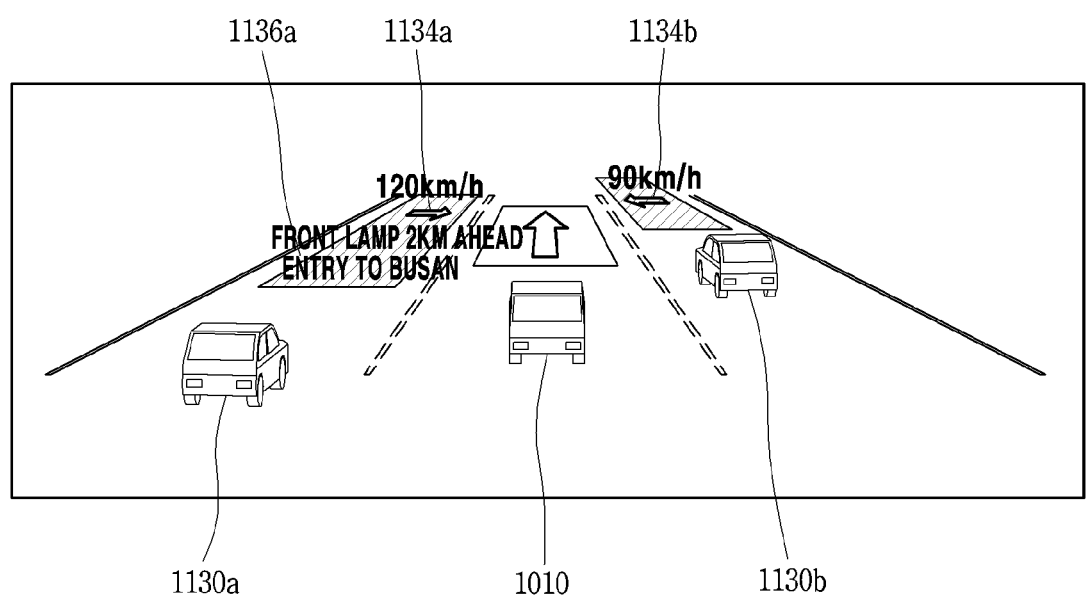

For example, as illustrated in FIG. 11E, when the driving-related information of the adjacent vehicle is received through the communication unit 810, the display unit 830 may further output thereon additional information 1136a (e.g., path information set in the adjacent vehicle, path change reason information, etc.) in addition to a graphic object 1130a corresponding to the adjacent vehicle, speed of the adjacent vehicle or an expected driving direction 1134a.

Also, the driving-related information of the adjacent vehicle received through the communication unit may have higher accuracy than the driving-related information of the adjacent vehicle decided through the sensing unit.

Since the driving-related information of the adjacent vehicle received through the communication unit is information that is directly set in the adjacent vehicle or received from a controller of the adjacent vehicle, it may have higher accuracy or reliability than the driving-related information of the adjacent vehicle decided through the sensing unit.

When first information related to driving of an adjacent vehicle (a specific vehicle) is received through the communication unit 810 and second information related to the driving of the adjacent vehicle (the specific vehicle) is decided through the sensing unit 820, the processor 870 may output the first information on the display unit 830, instead of the second information. This results from that the driving-related information received through the communication unit has higher certainty than the driving-related information decided through the sensing unit.

Meanwhile, when first information related to driving of a first adjacent vehicle is decided (received) through the communication unit 810 and second information related to driving of a second adjacent vehicle, different from the first adjacent vehicle, is decided through the sensing unit 820, as illustrated in FIG. 11E, the processor 870 may output the first information and the second information on the display unit 830 in a visually distinguishing manner.

For example, the processor 870 may output on the display unit 830 first information 1130a, 1134a and 1136a related to the driving of the first adjacent vehicle decided through the communication unit 810 and second information 1130*b* and 1134*b* related to the second adjacent vehicle decided through the sensing unit 820 in a manner of differing color, transparency, display form, output method and the like.

With this configuration, the present invention can easily recognize by which means (communication unit (V2X technology) or sensing unit) the driving-related information (driving intention) of the adjacent vehicle has been decided, and provide a user interface for intuitively deciding one of the two information to more rely on.

Figure 14:
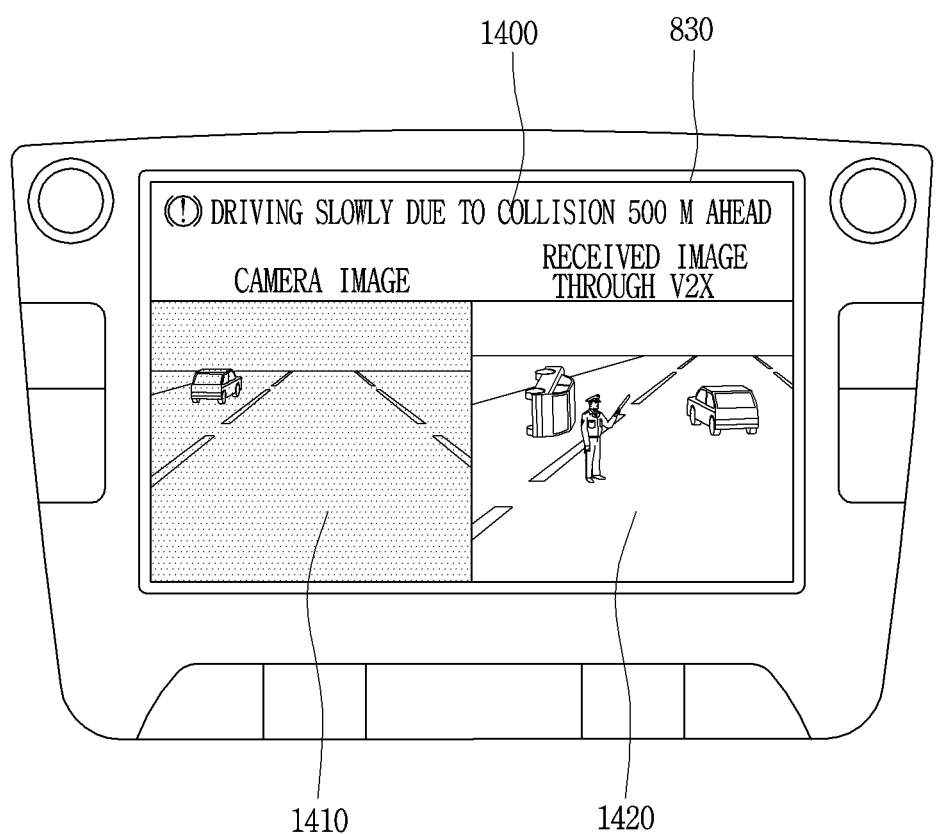

Meanwhile, as illustrated in FIG. 14, when first information (first information related to the driving of the adjacent vehicle) received through the communication unit 810 and second information (second information related to the driving of the adjacent vehicle) sensed through the sensing unit 820 are different from each other, the processor 870 may output both of the first information 1410 and the second information 1420 on the display unit 830.

For example, in a heavy rain situation, an object may not be detected through the sensing unit 820 (first information), but information indicating that an object is present at the front within a predetermined distance may be received through V2X communication of the communication unit 810. In this instance, the first information and the second information may be different from each other.

As another example, an area is determined as a parking-available area according to information decided through the sensing unit 820 (first information), but a signal indicating a parking-unavailable area (second information) may be received through V2X communication of the communication unit 810. In this instance, the first information and the second information may be different from each other.

In this instance, the processor 870 may provide a user interface that facilitates a user in recognizing related information by simultaneously outputting the first information received through the communication unit and the second information sensed through the sensing unit on the display unit 830.

Meanwhile, when first information (first information related to the adjacent information) received through the communication unit and second information (second information related to the adjacent vehicle) decided through the sensing unit are different from each other, the processor 870 may request for information (additional information) from at least one another adjacent vehicle. The additional information may be driving-related information of the adjacent vehicle decided by another vehicle other than the adjacent vehicle.

Afterwards, the processor 870 may decide one of the first information and the second information, on the basis of the information (additional information) received from the another adjacent vehicle.

The processor 870 may determine which one of the first information and the second information is accurate on the basis of the received additional information.

Afterwards, the processor 870 may output the decided information on the display unit 830.

With this configuration, the present invention can request for checking the first and second information from the another adjacent vehicle (other vehicle) when the first information and the second information are different from each other, thereby remarkably improving reliability of the driving-related information of the adjacent vehicle.

Meanwhile, according to the present invention, when the driving-related information of the adjacent vehicle is decided using at least one of the communication unit or the sensing unit, the decided information can be output on the display unit 830 based on a satisfaction of a preset condition.

Here, the preset condition may include at least one of when a vehicle manipulation is made to change a driving path of the vehicle, when the adjacent vehicle comes into a predetermined distance from the vehicle, when specific information is sensed from the adjacent vehicle, or when a user input is received.

Figure 12:
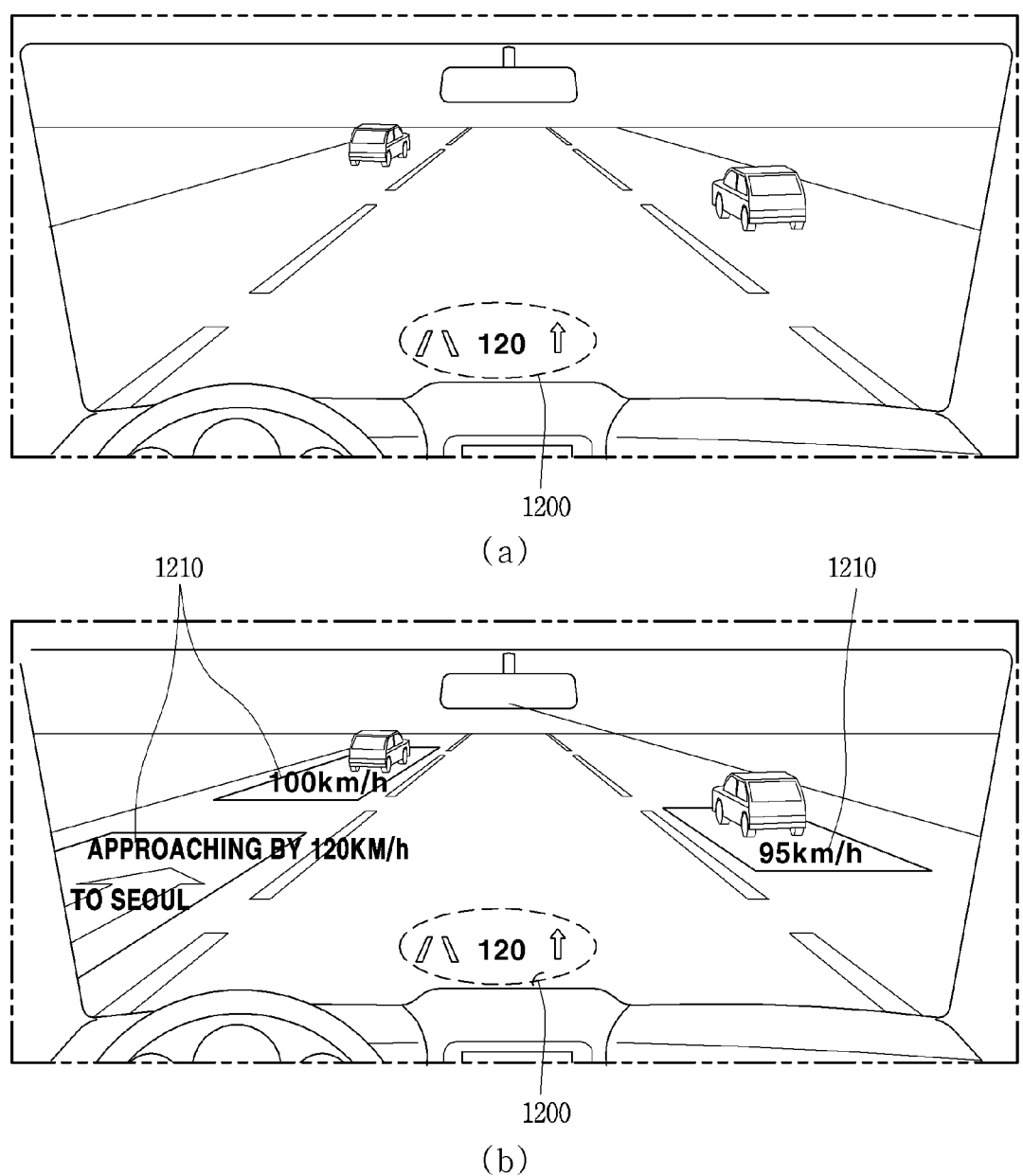

Referring to (a) of FIG. 12, in a state that a preset condition is not satisfied, the processor 870 of the present invention may output only driving-related information 1200 of the vehicle 100 on the display unit. The driving-related information 1200 of the vehicle 100 may include a driving direction of the vehicle 100, a driving speed of the vehicle 100 and the like.

Afterwards, as illustrated in (b) of FIG. 12, when the preset condition is satisfied, the processor 870 may output decided driving-related information 1210 of adjacent vehicles on the display unit 830.

Here, the processor 870 may output in more detail the driving-related information of an adjacent vehicle that more affects the driving of the vehicle 100. For example, the processor 870 may output in detail, highlight, increase an output size of, and apply an additional graphic effect to, the driving-related information of the adjacent vehicle more affecting the driving of the vehicle 100.

That is, in the present invention, the driving-related information of the adjacent vehicle may be output on the display unit on the assumption that the preset condition is satisfied. Also, when the preset condition is not satisfied, the processor 870 may not output the displayed driving-related information of the adjacent vehicle any more.

Meanwhile, when the driving-related information of the adjacent vehicle having the speculative intention is decided through the sensing unit 820, the processor 870 may request for and receive vehicle operation information regarding the adjacent vehicle through V2X and decide a correct intention of the adjacent vehicle based on the received information.

Meanwhile, the processor 870 may generate driving guide information related to the vehicle of the present invention by reflecting the driving-related information of the adjacent vehicle decided through at least one of the sensing unit or the communication unit.

For example, when the adjacent vehicle cuts in front of the vehicle 100, the processor 870 may generate driving guide information for guiding the driver of the vehicle 100 to step on the brake or to change a driving path so as to avoid the adjacent vehicle.

The processor 870 may output the driving guide information of the vehicle 100, to which the driving-related information of the adjacent vehicle has been reflected, on the display unit 830 together with the driving-related information of the adjacent vehicle.

That is, the driving guide information of the vehicle 100 can reflect the driving-related information of the adjacent vehicle, and thus can be changed in response to the change in the driving-related information of the adjacent vehicle.

With this configuration, the present invention can provide an optimized user interface for guiding the driving path (or driving operation) of the vehicle disclosed herein, by reflecting the driving-related information of the adjacent vehicle (the driving intention of the adjacent vehicle).

Meanwhile, the vehicle of the present invention can execute autonomous driving. The autonomous driving may be executed by the vehicle control device 800 (or controller 170), or by a separate autonomous driving module.

Figure 13A:
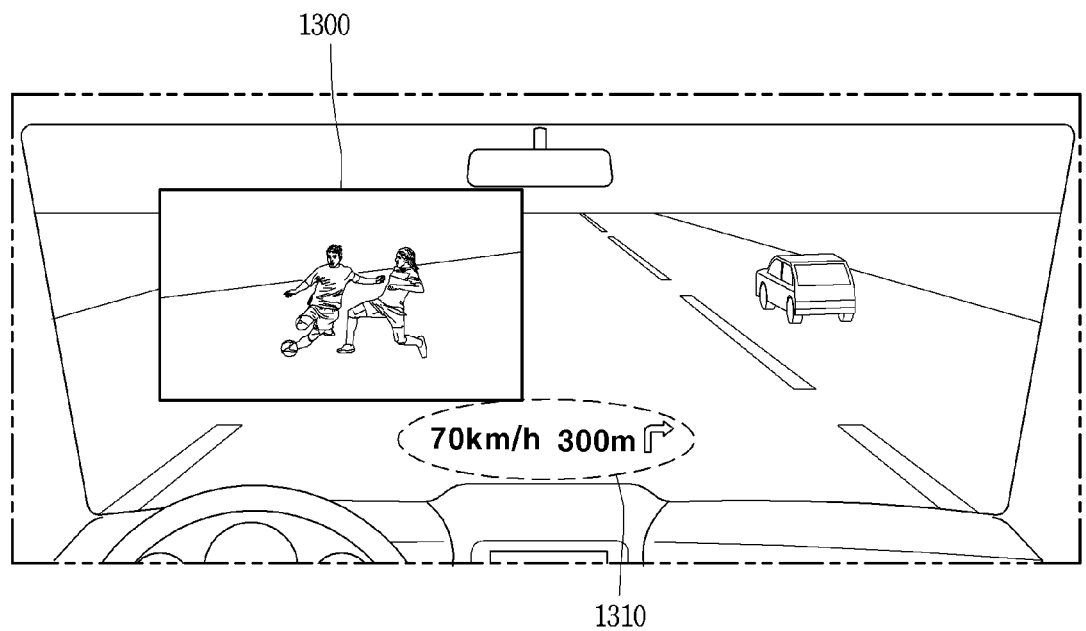
Figure 13A:
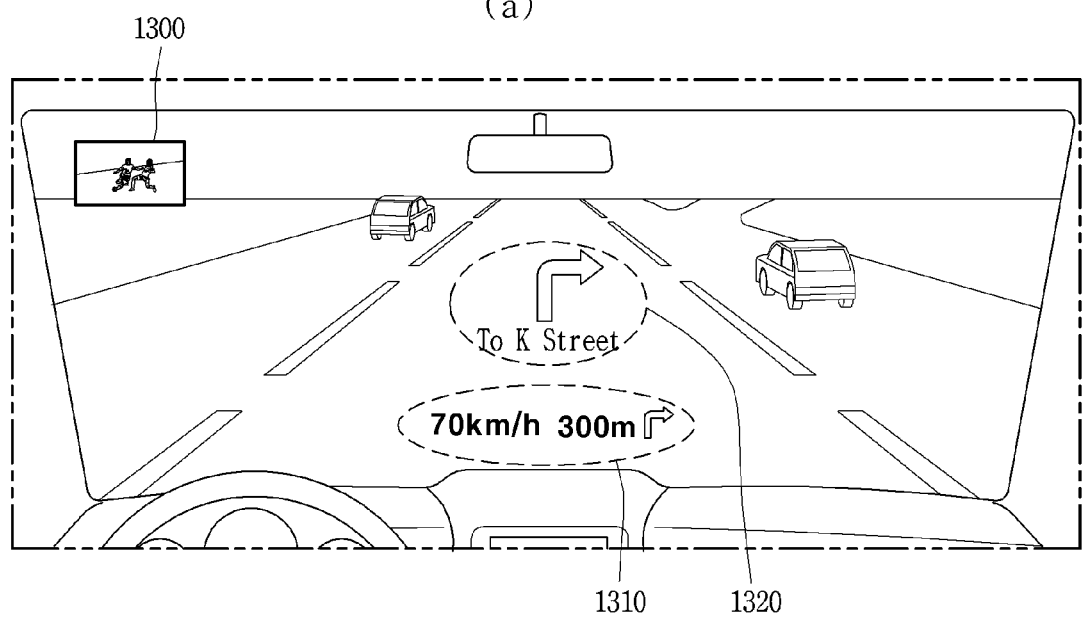

The processor 870, as illustrated in (a) of FIG. 13A, may output a predetermined content (e.g., video, image, graphic object, etc.) 1300 on the display unit 830 during the autonomous driving.

In the output state of the content 1300 on the display unit 830 during the autonomous driving of the vehicle 100, when the preset condition is met, as illustrated in (b) of FIG. 13A, the processor 870 may change an output method of the content 1300. As one example, the processor 870 may change an output size and an output position of the content 1300.

The processor 870, as illustrated in (b) of FIG. 13A, may output both of the content 1300 with the changed output method and the driving-related information of the adjacent vehicle on the display unit 830.

Figure 13B:
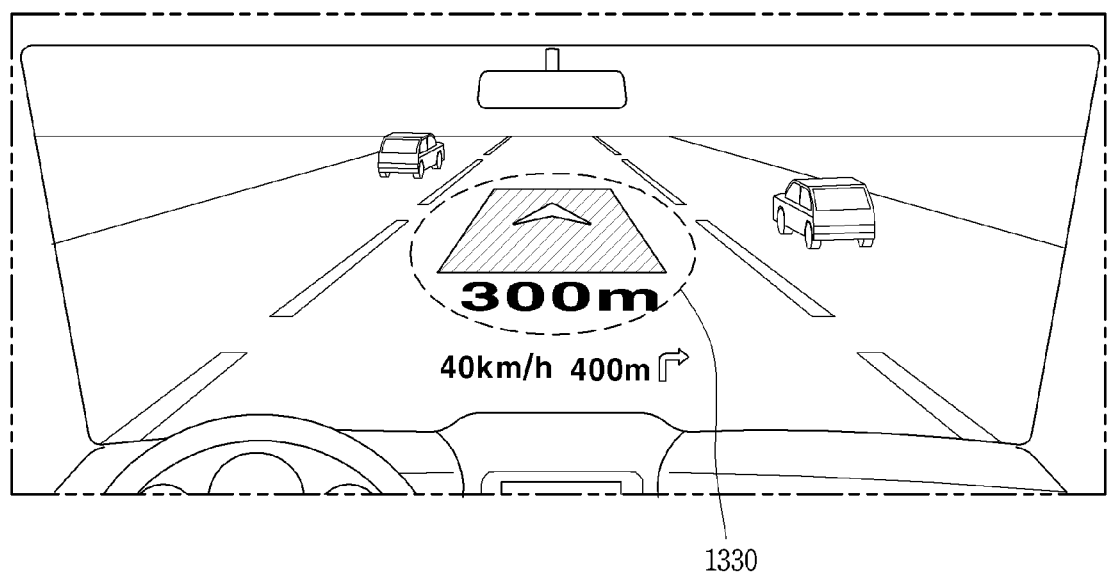

As illustrated in FIG. 13B, when the preset condition is met during manual driving of the vehicle, or when a driving road has to be changed according to path information set in the vehicle of the present invention, the processor 870 may also output driving-related information 1330 of the vehicle of the present invention on the display unit 830.

Meanwhile, when the driving state of the vehicle is changed during the autonomous driving of the vehicle 100, the processor 870 may output information that notifies the change in the driving state sensed through the sensing unit 820 on the display unit 830.

Figure 15:
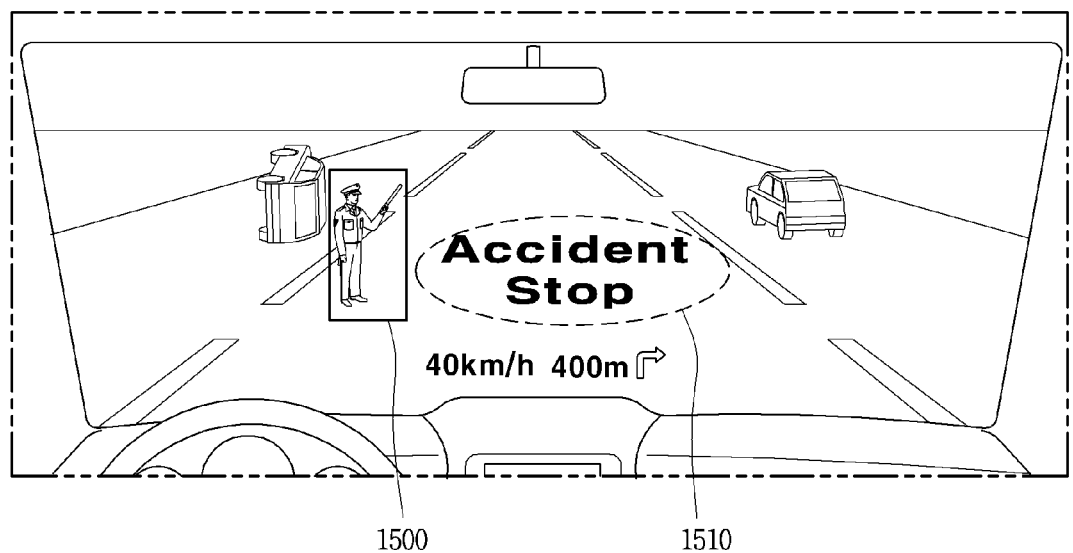

For example, as illustrated in FIG. 15, when the driving state of the vehicle is changed during the autonomous driving (e.g., lane change or braking), the processor 870 may decide a reason of the change in the driving state based on data sensed through the sensing unit.

Afterwards, the processor 870 may output information notifying the reason of the change in the driving state on the display unit 830. With this configuration, the present invention can provide a user interface for more intuitively notifying the changes in the driving state to the driver during the autonomous driving.

Also, when information related to the adjacent vehicle (e.g., the driving-related information of the adjacent vehicle) cannot be decided based on data sensed through the sensing unit 820 (e.g., when the data sensed through the sensing unit 820 is unreliable due to the weather or surrounding environments), the processor 870 may request for the driving-related information of the adjacent vehicle from the adjacent vehicle through the communication unit 810.

Afterwards, when the driving-related information is received from the adjacent vehicle, the processor 870 may output the received information on the display unit 830.

Figure 16:
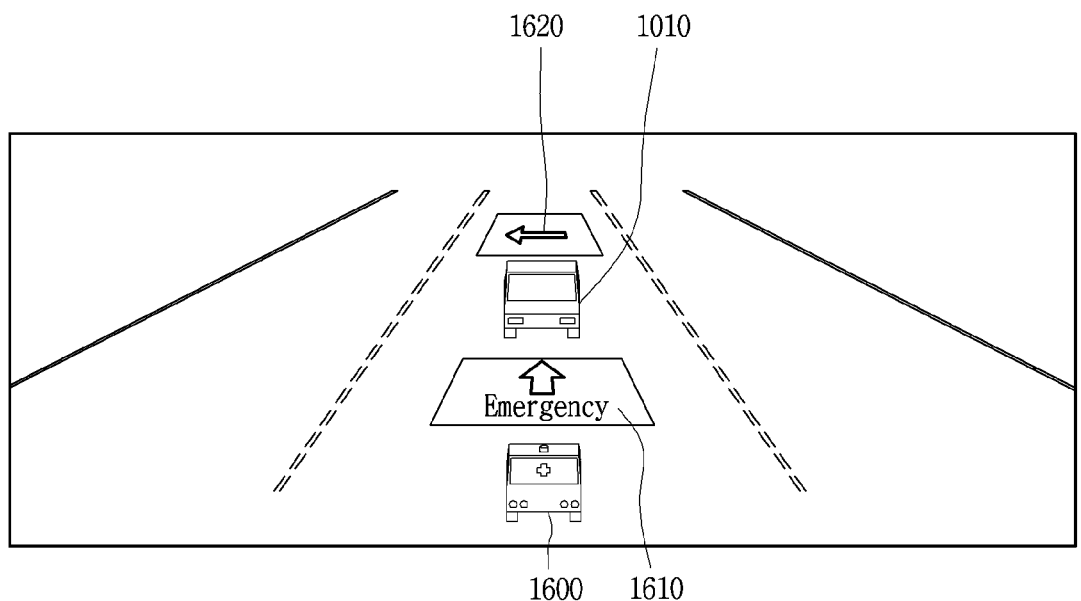

Meanwhile, when a specific situation (e.g., an emergency car approaching, etc.) is sensed through at least one of the communication unit 810 or the sensing unit 820, as illustrated in FIG. 16, the processor 870 may output information 1600 and 1610 notifying the specific situation, and driving guide information 1620 of the vehicle 100 according to the specific situation on the display unit 830.

Also, the processor 870 may vary a predetermined distance for sensing the adjacent vehicle on the basis of a speed of the vehicle 100 of the present invention.

For example, when the vehicle drives at a first speed, the processor 870 may sense only driving-related information of an adjacent vehicle existing within a first radius from the vehicle 100 of the present invention. Also, when the vehicle drives at a second speed faster than the first speed, the processor 870 may decide driving-related information of adjacent vehicles which exist within a second radius greater than the first radius from the vehicle 100.

Accordingly, when the vehicle of the present invention drives at the first speed (e.g., when the speed of the vehicle 100 is slow), the processor 870 may output driving-related information of adjacent vehicles present on only left and right lanes including the driving lane of the vehicle 100. When the vehicle 100 drives at the second speed (e.g., when the speed of the vehicle 100 is fast), the processor 870 may output driving-related information of adjacent vehicles present on more lanes.

That is, the processor 870 may zoom in a graphic interface of outputting the driving-related information of the adjacent vehicle when the speed of the vehicle is slow, and zoom out the graphic object when the speed of the vehicle is increasing.

Also, when the adjacent vehicle sensed through the sensing unit 820 is determined as a dangerous vehicle (e.g., sleep driving, drunk driving, etc.), the processor 870 may notify a risk to a user by applying an additional graphic effect to a graphic object corresponding to the dangerous vehicle.

Also, the processor 870 may output path information set by the user (or previously-used path information) during autonomous driving on the display unit 830 in a highlighting manner. When the vehicle 100 drives along another path according to a traffic condition or a driving state, the processor 870 can also provide a user interface capable of outputting map information for notifying the changed path information on the display unit 830 for a predetermined time.

According to the embodiments of the present invention, at least one of the following effects can be obtained.

First, the present invention can provide an optimized user interface, capable of notifying a driver of a more correct driving intention of an adjacent vehicle using a sensing unit and a communication unit.

Second, the present invention can provide a vehicle control device, capable of complementing the driving intention of the adjacent vehicle to be more correct, by using the communication unit, when the driving intention of the adjacent vehicle decided through the sensing unit is uncertain, and a method for controlling the vehicle.

The effects of the present invention may not be limited to the aforementioned effects, and other effects which have not been described will be clearly understood by those skilled in the art from the description of claims.

The vehicle control device 800 may be included in the vehicle 100.

Also, the operation or the control method of the vehicle control device 800 will be equally/similarly applied to the operation or the control method of the vehicle 100 (or controller 170).

For example, the control method for the vehicle 100 (or the control method for the vehicle control device 800) may include deciding driving-related information of an adjacent vehicle using at least one of a communication unit or a sensing unit, and outputting the decided driving-related information of the adjacent vehicle on a display nit on the basis of a satisfaction of a preset condition.

Here, the driving-related information of the adjacent vehicle may include at least one of speed information, acceleration/deceleration information or expected moving direction information.

Also, the preset condition may include at least one of when a vehicle manipulation is executed to change a driving path of the vehicle, when the adjacent vehicle comes into a predetermined distance from the vehicle, when specific information is sensed from the adjacent vehicle, or when a user input is received.

Those steps may be executed by the controller 170 provided in the vehicle 100 as well as the vehicle control device 800.

Also, every function, configuration or control method executed by the vehicle control device 800 may be executed by the controller 170 provided in the vehicle 100. That is, every control method described in this specification may also be applied to the control method for the vehicle and the control method for the control device.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device provided in a vehicle, the device comprising:
   a communication unit;
   a sensor;
   a display; and
   a processor configured to output driving-related information of an adjacent vehicle on the display upon satisfaction of a preset condition, the outputted driving-related information being determined by using at least one of the communication unit and the sensor,
   wherein the outputted driving-related information is at least one of first information related to driving of the adjacent vehicle when received through the communication unit or second information related to driving of the adjacent vehicle when sensed by the sensor, and
   wherein the processor is configured to output both the first information and the second information on the display when the first information and the second information are different from each other.

2. The device of claim 1, wherein the driving-related information of the adjacent vehicle includes at least one of speed information related to the adjacent vehicle, acceleration/deceleration information related to the adjacent vehicle, or expected moving direction information related to the adjacent vehicle.

3. The device of claim 1, wherein the processor is configured to determine the driving-related information of the adjacent vehicle based on at least one of a physical state of the adjacent vehicle or a driving state of the adjacent vehicle sensed through the sensor.

4. The device of claim 1, wherein the processor is configured to determine the driving-related information of the adjacent vehicle by receiving the driving-related information of the adjacent vehicle from the adjacent vehicle through the communication unit.

5. The device of claim 1, wherein the processor is configured to output the first information, and not the second information, on the display when both the first information and the second information are determined by the processor.

6. The device of claim 1, wherein the preset condition includes at least one of when a vehicle manipulation is executed to change a driving path of the vehicle, when the adjacent vehicle comes within a predetermined distance from the vehicle, when specific information is sensed from the adjacent vehicle, or when a user input is received.

7. The device of claim 1, wherein the processor is configured to output driving guide information related to the vehicle on the display, together with the driving-related information of the adjacent vehicle, the driving guide information having the driving-related information of the adjacent vehicle reflected therein.

8. The device of claim 7, wherein the driving guide information related to the vehicle is changed in response to a change in the driving-related information of the adjacent vehicle.

9. The device of claim 1, wherein, when a specific situation is sensed through at least one of the communication unit or the sensor, the processor is configured to output on the display information notifying the specific situation and driving guide information related to the vehicle according to the specific situation.

10. A vehicle having the vehicle control device according to claim 1.

11. A vehicle control device provided in a vehicle, the device comprising:
    a communication unit;
    a sensor;
    a display; and
    a processor configured to output driving-related information of an adjacent vehicle on the display upon satisfaction of a preset condition, the outputted driving-related information being determined by using at least one of the communication unit and the sensor,
    wherein the outputted driving-related information is at least one of first information related to driving of the adjacent vehicle when received through the communication unit or second information related to driving of the adjacent vehicle when sensed by the sensor, and
    wherein the processor is configured to request information from at least one other adjacent vehicle when the first information and the second information are different from each other, and is configured to display one of the first information and the second information based on the information received from the at least one other adjacent vehicle.

12. A vehicle control device provided in a vehicle, the device comprising:
    a communication unit;
    a sensor;
    a display; and
    a processor configured to output driving-related information of an adjacent vehicle on the display upon satisfaction of a preset condition, the outputted driving-related information being determined by using at least one of the communication unit and the sensor,
    wherein the adjacent vehicle is a first adjacent vehicle, and
    wherein the processor is configured to output in a visually distinguishing manner first information related to driving of the first adjacent vehicle received through the communication unit and second information related to driving of a second adjacent vehicle sensed by the sensor.

13. A vehicle control device provided in a vehicle, the device comprising:
- a communication unit;
- a sensor;
- a display; and
- a processor configured to output driving-related information of an adjacent vehicle on the display upon satisfaction of a preset condition, the outputted driving-related information being determined by using at least one of the communication unit and the sensor,
- wherein the vehicle is capable of driving autonomously, and
- wherein, when the preset condition is satisfied during the autonomous driving of the vehicle, the processor is configured to change an output method of a content on the display and outputs both of the content with the changed output method and the driving-related information of the adjacent vehicle on the display.

14. A vehicle control device provided in a vehicle, the device comprising:
- a communication unit;
- a sensor;
- a display; and
- a processor configured to output driving-related information of an adjacent vehicle on the display upon satisfaction of a preset condition, the outputted driving-related information being determined by using at least one of the communication unit and the sensor,
- wherein the vehicle is capable of driving autonomously, and
- wherein, when a driving state of the vehicle is changed during the autonomous driving of the vehicle, the processor is configured to output on the display information notifying a reason of the change in the driving state of the vehicle sensed through the sensor.

15. A vehicle control device provided in a vehicle, the device comprising:
- a communication unit;
- a sensor;
- a display; and
- a processor configured to output driving-related information of an adjacent vehicle on the display upon satisfaction of a preset condition, the outputted driving-related information being determined by using at least one of the communication unit and the sensor,
- wherein the processor is configured to request the adjacent vehicle to transmit the driving-related information of the adjacent vehicle through the communication unit when the driving-related information of the adjacent vehicle cannot be determined by data sensed through the sensor.

16. A method for controlling a vehicle having a vehicle control device, the method comprising:
- deciding driving-related information of an adjacent vehicle using at least one of a communication unit and a sensor; and
- outputting the decided driving-related information of the adjacent vehicle on a display upon satisfaction of a preset condition,
- wherein the outputted driving-related information is at least one of first information related to driving of the adjacent vehicle when received through the communication unit or second information related to driving of the adjacent vehicle when sensed by the sensor, and
- wherein the method further comprises outputting both the first information and the second information on the display when the first information and the second information are different from each other.

17. The method of claim 16, wherein the driving-related information of the adjacent vehicle includes at least one of speed information related to the adjacent vehicle, acceleration/deceleration information related to the adjacent vehicle or expected moving direction information related to the adjacent vehicle.

18. The method of claim 16, wherein the preset condition includes at least one of when a vehicle manipulation is executed to change a driving path of the vehicle, when the adjacent vehicle comes within a predetermined distance from the vehicle, when specific information is sensed from the adjacent vehicle, or when a user input is received.

* * * * *